United States Patent
Hausmann et al.

(10) Patent No.: US 10,920,951 B2
(45) Date of Patent: Feb. 16, 2021

(54) HEADLIGHT FOR A MOTOR VEHICLE

(71) Applicant: Bayerische Motoren Werke Aktiengesellschaft, Munich (DE)

(72) Inventors: Thomas Hausmann, Munich (DE); Rene Uebler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 36 days.

(21) Appl. No.: 16/294,699

(22) Filed: Mar. 6, 2019

(65) Prior Publication Data

US 2019/0203901 A1   Jul. 4, 2019

Related U.S. Application Data

(63) Continuation of application No. PCT/EP2017/071481, filed on Aug. 28, 2017.

(30) Foreign Application Priority Data

Sep. 7, 2016   (DE) ................ 10 2016 217 020.1

(51) Int. Cl.
*F21S 41/657*   (2018.01)
*F21S 41/16*   (2018.01)
*F21S 41/141*   (2018.01)
*B60Q 1/00*   (2006.01)
*B60Q 1/076*   (2006.01)
(Continued)

(52) U.S. Cl.
CPC .......... *F21S 41/657* (2018.01); *B60Q 1/0041* (2013.01); *B60Q 1/076* (2013.01); *B60Q 1/085* (2013.01); *B60Q 1/14* (2013.01); *F21S 41/141* (2018.01); *F21S 41/16* (2018.01); *F21S 41/663* (2018.01); *B60Q 2300/40* (2013.01)

(58) Field of Classification Search
CPC ........ F21S 41/141; F21S 41/16; F21S 41/657; F21S 41/663; B60Q 1/0041
See application file for complete search history.

(56) References Cited

U.S. PATENT DOCUMENTS 9,789,808 B1 * 10/2017 Hong ................ B60Q 1/085
10,584,842 B2 * 3/2020 Park .................. F21S 41/141
(Continued)

FOREIGN PATENT DOCUMENTS

DE   10 2004 053 320 A1   6/2005
EP       2 551 154 A2   1/2013
(Continued)

OTHER PUBLICATIONS

Machine translation of WO2014/205466 (Year: 2014).*
(Continued)

*Primary Examiner* — Leah Simone Macchiarolo
(74) *Attorney, Agent, or Firm* — Crowell & Moring LLP

(57) ABSTRACT

The invention relates to a headlight for a motor vehicle having a plurality of main light modules configured to produce a main light distribution for low beam and high beam. The headlight also has a laser light module comprised of one or more laser diodes configured to produce a laser light distribution in addition to the main light distribution. The headlight is configured such that, during operation, the laser light distribution is movable in a manner decoupled from the main light distribution and relative to the main light distribution.

9 Claims, 1 Drawing Sheet

(51) Int. Cl.
*B60Q 1/08* (2006.01)
*F21S 41/663* (2018.01)
*B60Q 1/14* (2006.01)

(56) References Cited

U.S. PATENT DOCUMENTS

| | | | |
|---|---|---|---|
| 2007/0102214 A1* | 5/2007 | Wittorf | G08G 1/166 |
| | | | 180/167 |
| 2009/0041300 A1* | 2/2009 | Mack | B60Q 1/085 |
| | | | 382/103 |
| 2016/0159273 A1* | 6/2016 | Nakazato | F21S 41/16 |
| | | | 315/79 |
| 2017/0067609 A1* | 3/2017 | Ichikawa | B60Q 1/0683 |
| 2017/0299138 A1* | 10/2017 | Zawacki | F21S 41/148 |
| 2019/0120454 A1* | 4/2019 | Mouri | F21S 41/36 |

FOREIGN PATENT DOCUMENTS

| | | |
|---|---|---|
| EP | 3 048 362 A1 | 7/2016 |
| JP | 2015-201296 A | 11/2015 |
| WO | WO 2014/205466 A1 | 12/2014 |

OTHER PUBLICATIONS

PCT/EP2017/071481, International Search Report dated Dec. 18, 2017 (Two (2) pages).

German Search Report issued in German counterpart application No. 10 2016 217 020.1 dated Mar. 28, 2017, with Statement of Relevancy (Seven (7) pages).

\* cited by examiner

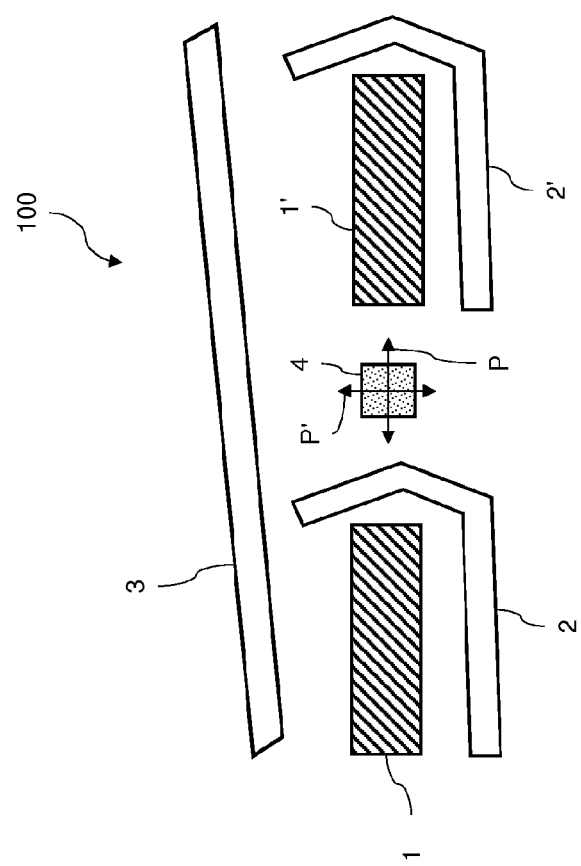

HEADLIGHT FOR A MOTOR VEHICLE

CROSS REFERENCE TO RELATED APPLICATIONS

This application is a continuation of PCT International Application No. PCT/EP2017/071481, filed Aug. 28, 2017, which claims priority under 35 U.S.C. § 119 from German Patent Application No. 10 2016 217 020.1, filed Sep. 7, 2016, the entire disclosures of which are herein expressly incorporated by reference.

BACKGROUND AND SUMMARY OF THE INVENTION

The invention relates to a headlight for a motor vehicle and to a corresponding motor vehicle.

To improve the range of headlights in motor vehicles, it is known from the prior art to use, in addition to main light modules which are used to produce low beam and high beam, a laser light module having high luminance. The laser light module is here coupled rigidly to a main light module, such that always only the same region of the light distribution is increased in its intensity by the laser light module, even if the corresponding main light module in the headlight is pivotable.

It is an object of the invention to provide a headlight for a motor vehicle with which adaptive light functions can be realized using a laser light module.

The headlight according to the invention is provided for a motor vehicle. In particular, it is a front headlight for a motor vehicle. The headlight comprises a number of main light modules (i.e., one or more main light modules) for producing a main light distribution for low beam and high beam. Depending on the actuation of the headlight, the main light distribution produced can represent either the low beam or the high beam. The individual main light modules can in each case be provided for producing both the low beam and the high beam, or for producing only the low beam or the high beam. Nevertheless, the totality of all main light modules produces a desired low beam and a desired high beam by way of corresponding actuation, specifically independently of whether an individual main light module is provided only for producing low beam or high beam or is provided both for producing the low beam and the high beam. The headlight according to the invention furthermore comprises a laser light module made of one or more laser diodes for producing a laser light distribution in addition to the main light distribution. The headlight can possibly comprise a plurality of such laser light modules. However, preferably only a single laser light module is provided.

The headlight according to the invention is characterized in that, during its operation, the laser light distribution is decoupled from the main light distribution and movable, and preferably pivotable, relative to said main light distribution. In other words, the setup of the headlight according to the invention makes it possible that it is actuable using a control device such that a movement of the laser light distribution is performed in decoupled fashion from and relative to the main light distribution.

The headlight according to the invention has the advantage that, independently of the positioning of the main light distribution, specific regions in front of the vehicle can be illuminated, depending on the situation, with greater light intensity. In this way, it is possible using the laser light module to produce an adaptive light distribution to supplement the main light distribution in the light of the headlight.

In a particularly preferred refinement of the headlight according to the invention, the laser light module or possibly only part of the laser light module is movable by way of an actuator system relative to the number of main light modules in order to hereby effect a movement and in particular a pivoting movement of the laser light distribution in a manner decoupled from the main light distribution and relative thereto. Consequently, a suitable actuator system, which converts electrical current into mechanical movement, is used to attain the movement of the laser light distribution. Alternatively or additionally, the laser light module can also comprise a micro-optical system which effects a movement of the laser light distribution in a manner decoupled from the main light distribution and relative thereto. The micro-optical system can comprise for example in a manner known per se an array of micromirrors.

In a further preferred variant of the invention, one or more of the main light modules and in particular all main light modules are LED modules, which in each case comprise one or more LEDs (e.g., 5 to 30 LEDs) for producing the main light distribution. Hereby, a main light distribution with a good range can be generated.

In a further preferred embodiment, one or more of the main light modules and in particular all main light modules are segmented light modules, which during operation produce in each case a light distribution and in particular a high beam from segments which are able to be switched on and off. Such segmented light modules are preferably realized by the above-described LED light modules. It is possible in a suitable manner using the segmented light modules to leave out specific regions from the light distribution depending on the situation, for example, in order to avoid dazzling road users.

In a further, particularly preferred embodiment, one or more of the main light modules and in particular all main light modules are attached rigidly in the headlight. Consequently, the installation size of the headlight is reduced.

In a further variant of the headlight according to the invention, the headlight comprises two main light modules, which are arranged one next to the other in the direction of the vehicle width when the headlight is installed in the motor vehicle, wherein the laser light module is situated in the direction of the vehicle width between or next to the main light modules. The headlight preferably comprises exactly two main light modules and no further main light modules. Nevertheless, the headlight can also possibly contain only one main light module or more than two main light modules.

Depending on the refinement, the headlight according to the invention can be used to realize different light functions. In a preferred embodiment, the headlight is configured such (i.e., actuable using a control device such) that in an operating mode of the headlight, regions of the main light distribution which do not result in the dazzling of other road users are intensified. Alternatively or additionally, the headlight according to the invention is configured such, and within this meaning is actuable using a control device such, that, in an operating mode of the headlight, one or more objects which are situated in front of the headlight in the emission direction thereof are illuminated. Hereby, the driver of the motor vehicle is made aware of a risk of collision.

In addition to the above-described headlights, the invention relates to a motor vehicle which comprises one or more headlights according to the invention or one or more preferred variants of the headlight according to the invention.

Other objects, advantages and novel features of the present invention will become apparent from the following detailed description of one or more preferred embodiments when considered in conjunction with the accompanying drawing.

BRIEF DESCRIPTION OF THE DRAWING

One exemplary embodiment of the invention will be described in detail below with reference to FIG. 1.

FIG. 1 shows, in a schematic illustration, a variant of a headlight according to one embodiment of the invention.

DETAILED DESCRIPTION OF THE DRAWING

FIG. 1 schematically illustrates, as an exemplary embodiment of the invention, the left-side front headlight 100 of a motor vehicle (not illustrated) in a plan view of the front of the motor vehicle. The right-side front headlight is set up mirror-symmetrically identically to the left-side front headlight, and both front headlights serve, during operation, for the generation of the high beam and of the low beam in front of the motor vehicle. For controlling the different light modules of the headlight 100 described below, a control device (not illustrated) is provided. Here, the control device processes information from other sensors which capture for example the light of the oncoming traffic or recognize objects on the road in front of the motor vehicle.

In a manner known per se, the headlight 100 comprises an inner main light module 1 and an outer main light module 1', which are indicated by hatched rectangles and are installed rigidly in the headlight. In the embodiment described here, both main light modules 1 and 1' each serve for generating low beam and high beam. Both main light modules are LED light modules, which each comprise a multiplicity of LEDs, the light of which is cast onto the road via a projection optical unit in the respective main light module. By activating specific LEDs using the above-mentioned control device, it is possible to only generate the low beam distribution or to switch on the high beam. The main light modules are furthermore segmented light modules with which the activated high beam is divided into a plurality of segments which are able to be switched on and off, wherein the segments in the light distribution represent vertical bars. The segments are here switched on and off by activating or deactivating assigned LEDs using the control device. In this way, depending on the traffic situation, specific regions in the light distribution can be left out so as to avoid, for example, dazzling road users.

In addition to the two main light modules 1 and 1', the headlight of FIG. 1 comprises in a manner known per se two daytime running light modules 2 and 2', which are switched on upon activation of the daylight running light and comprise in each case one light guide LED unit. The headlight 100 furthermore comprises an indicator light above the light modules 1, 1', 2 and 2', which is designated with the reference numeral 3.

The front headlight of FIG. 1 is characterized in that, in addition to the main light modules 1 and 1', a laser light module 4 is provided, which is indicated schematically by a dotted square and produces white laser light. The laser light module is arranged between the two main light modules 1 and 1', but can also be positioned at any other desired position in the headlight, e.g., on the left next to the inner main light module 1 or on the right next to the outer main light module 1'. As compared to conventional headlights, the laser light module 4 is pivotable in the horizontal and vertical direction, as is indicated by the double-headed arrows P and P', independently of the main light modules 1 and 1'. To pivot the laser light module, an actuator system (not illustrated) is provided, which converts electrical current into a mechanical movement of the laser light module 4. The actuator system can be realized for example by way of a servomotor. The actuator system is actuated using the above-mentioned control device.

In the embodiment of FIG. 1, the laser light module 4 comprises an individual laser diode for the production of its laser light distribution. If required, a plurality of laser diodes can also be installed in the laser light module 4. Moreover, the laser light that is produced with the laser diode is cast directly onto the road via a projection optical unit made of reflector and lens. In a modified embodiment, the laser light module can also be a fiber-based light module, in which the laser light that is produced by the laser diode is guided to a corresponding exit site at the projection optical unit using a light guide.

Due to the pivotability of the laser light module 4 which is decoupled from the main light modules, it is possible, depending on the requirement, for specific light regions in the main light distribution or outside the main light distribution to be illuminated at great intensity. In a modified embodiment, this light function can also be obtained by way of a laser light module which is installed rigidly in the headlight, wherein in this case the laser light distribution is moved, e.g., by a micromirror array which is known per se, without relative movement of the laser light module with respect to the remaining headlight.

The embodiment of the invention described above has a number of advantages. In particular, the light distribution generated with the main light modules is combined simply with an adaptive laser light distribution, wherein the position of the produced laser light distribution is independent of the position of the remaining light distribution. In this way, many different light functions can be realized. In particular, specific regions in the high beam which do not result in the dazzling of road users can be intensified. In contrast, regions that do dazzle other road users are left out by corresponding switching-off of segments in the segmented main light modules.

Moreover, recognized objects in front of the motor vehicle determined with the laser light distribution, such as pedestrians or animals, can be illuminated in dedicated fashion so as to warn the driver in this way. The laser light distribution can likewise be used for realizing a cornering light in which the inside of a traveled curve is lit using the laser light. Moreover, it is also possible for only regions of the low beam to be intensified, if the high beam is switched off, by the adaptive laser light distribution. The use of the additional laser light module furthermore has the advantage that the range of the light of the headlight and its contrast are enhanced. Likewise, the installation space is reduced as compared to conventional headlights in which the main light modules are pivotable.

LIST OF REFERENCE SIGNS

100 headlight
1, 1' main light modules
2, 2' daylight running light modules
3 indicator light
4 laser light module
P, P' pivot directions of the laser light module The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A headlight for a motor vehicle, comprising:
   a plurality of main light modules configured to produce a main light distribution for a low beam;
   a laser light module comprised of one or more laser diodes configured to produce a laser light distribution in addition to the main light distribution,
   wherein the headlight is configured such that, during operation, the laser light distribution is movable in a manner decoupled from the main light distribution and relative to the main light distribution;
   wherein the laser light module is pivotable in a horizontal direction and a vertical direction independently of the plurality of main light modules by an actuator system which converts electrical current into a mechanical movement of the laser light module to effect a movement of the laser light distribution in the manner decoupled from the main light distribution and relative to the main light distribution.

2. The headlight as claimed in claim 1, wherein one or more of the plurality of main light modules are LED light modules each comprising one or more LEDs to produce the main light distribution.

3. The headlight as claimed in claim 1, wherein one or more of the plurality of main light modules are segmented light modules that each produce, during operation, a light distribution from segments which are able to be switched on and off.

4. The headlight as claimed in claim 1, wherein one or more of the plurality of main light modules are attached rigidly in the headlight.

5. The headlight as claimed claim 1, wherein the headlight is configured such that, in an operating mode of the headlight, regions of the main light distribution which do not result in dazzling other road users are intensified.

6. The headlight as claimed in claim 1, wherein the headlight is configured such that, in an operating mode of the headlight, one or more objects which are situated in front of the headlight in an emission direction are illuminated.

7. The headlight as claimed claim 1, wherein the laser light distribution is movable in a manner decoupled from the main light distribution and relative to the main light distribution such that a light region outside of the main light distribution is illuminated by the laser light distribution.

8. A motor vehicle comprising a headlight, wherein the headlight comprises:
   a plurality of main light modules configured to produce a main light distribution for a low beam and a high beam;
   a laser light module comprised of one or more laser diodes configured to produce a laser light distribution in addition to the main light distribution,
   wherein the headlight is configured such that, during operation, the laser light distribution is movable in a manner decoupled from the main light distribution and relative to the main light distribution;
   wherein the laser light module is pivotable in a horizontal direction and a vertical direction independently of the plurality of main light modules by an actuator system which converts electrical current into a mechanical movement of the laser light module to effect a movement of the laser light distribution in the manner decoupled from the main light distribution and relative to the main light distribution.

9. The motor vehicle as claimed claim 8, wherein the laser light distribution is movable in a manner decoupled from the main light distribution and relative to the main light distribution such that a light region outside of the main light distribution is illuminated by the laser light distribution.

* * * * *